United States Patent [19]

Smith et al.

[11] Patent Number: 4,603,567

[45] Date of Patent: Aug. 5, 1986

[54] PROGRAMMABLE MANUFACTURING SYSTEM FOR LOAD/SUPPORT ARMS FOR MAGNETIC DISK DRIVE DATA STORAGE SYSTEMS

[75] Inventors: Ronald A. Smith, Los Gatos; James M. Jackson, Menlo Park; Carl L. Lehfeldt, Los Gatos; Leonard P. Cygnarowicz; Khosro Moshfegh, both of San Jose; Kenneth L. Blanchard, Santa Clara; Kenneth J. Nelson, Fremont, all of Calif.

[73] Assignee: Ronald A. Smith & Associates, Campbell, Calif.

[21] Appl. No.: 756,600

[22] Filed: Jul. 19, 1985

[51] Int. Cl.$^4$ .............................. B21B 37/12
[52] U.S. Cl. .............................. 72/8; 72/11; 72/16; 72/342; 72/27
[58] Field of Search ............ 72/16, 12, 11, 8, 338, 72/342, 405, 364, 422, 27

[56] References Cited

U.S. PATENT DOCUMENTS

| 3,170,140 | 2/1965 | Steinkuhl | 72/16 |
| 3,518,441 | 6/1970 | Selger | 72/16 |
| 4,528,830 | 2/1985 | Masui | 72/16 |

FOREIGN PATENT DOCUMENTS 1811174 6/1970 Fed. Rep. of Germany .

Primary Examiner—Leon Gilden
Attorney, Agent, or Firm—Claude A. S. Hamrick

[57] ABSTRACT

A manufacturing system is described for sequentially bending a plurality of planar spring elements extending from a regularly perforated bar or fret, then adjusting the resiliency of each element to provide a precise load when deflected to a particular position, and finally shearing only those elements meeting the desired deflection load criteria from the fret. A microprocessor obtains necessary processing data while controlling the several stations at which the spring elements are measured, formed (bent), thermally adjusted and sheared from the fret. A walking beam transport system also controlled by the microprocessor incrementally transports the frets of spring elements between and through each station. An oven can be incorporated into the walking beam transport system between the forming and thermal adjust stations for stress relieving the spring elements before adjustment.

Particular features of the system include a translating shuttle mechanism with a plurality of parallel rails for loading frets onto the walking beam transport system, linear cam actuators for moving load cells into engagement with a load arm extending from each spring element, a resilient deflecting guard mechanism protecting the sensor head of the load cells, and a precision bending mechanism in which a pair of pivotably mounted and orthogonally related linear bearing races support carriages translated by a pair of orthogonally related linear actuators for rolling a bending element around a cylindrical mandrel.

The invented system and apparatus has particular utility for manufacture of the precision load arms which support flying read/write heads of disk drive data storage systems.

19 Claims, 15 Drawing Figures

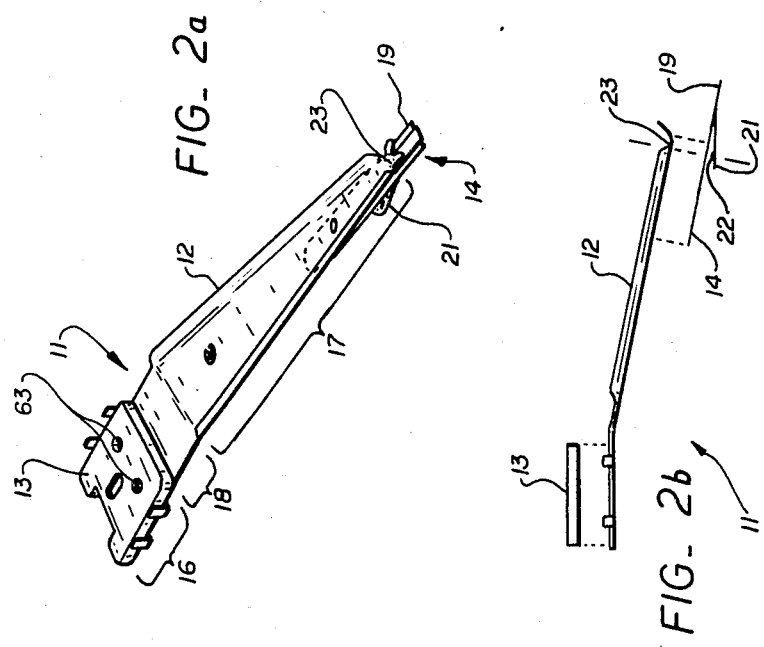

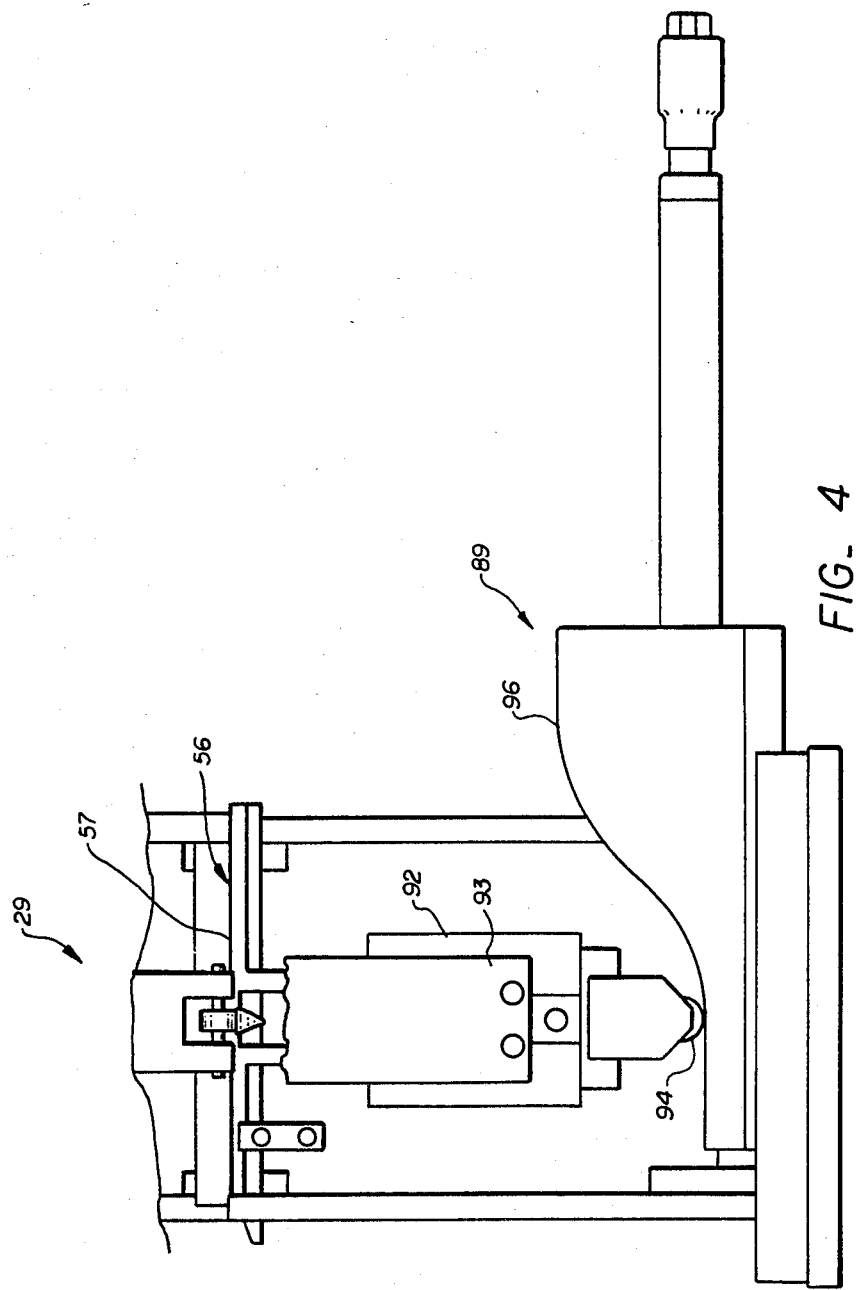

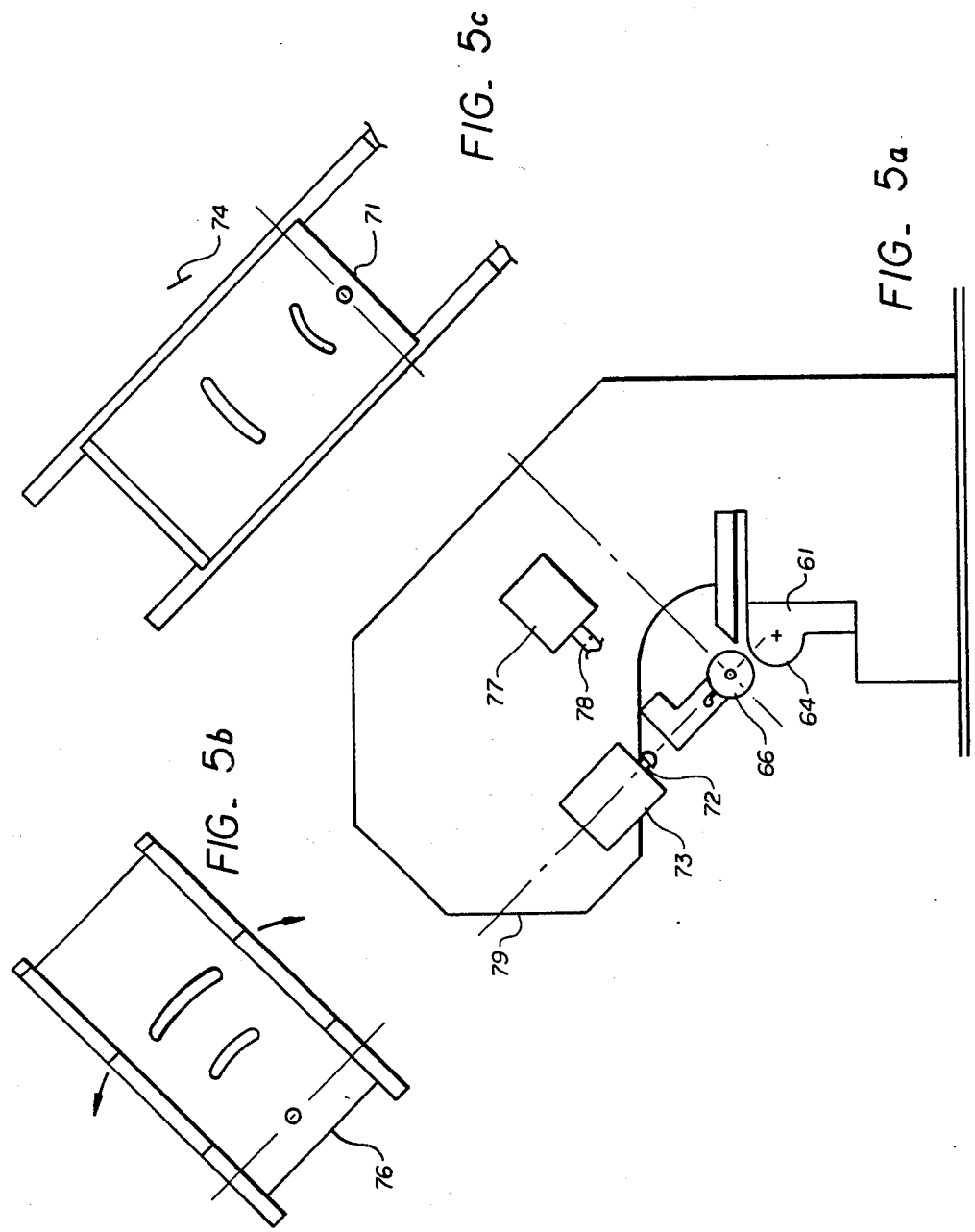

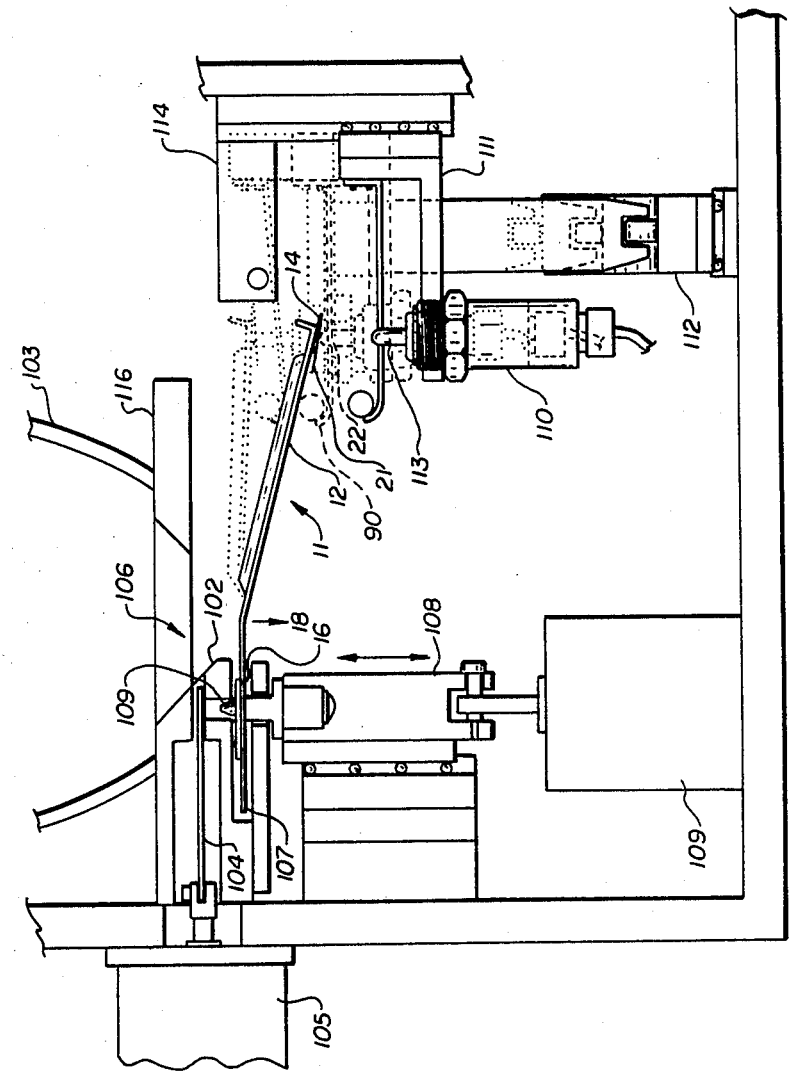

1st POSITION

2nd POSITION

4,603,567

PROGRAMMABLE MANUFACTURING SYSTEM FOR LOAD/SUPPORT ARMS FOR MAGNETIC DISK DRIVE DATA STORAGE SYSTEMS

BACKGROUND OF THE INVENTION

1. Field of the Invention

The invention relates generally to a system including methods and apparatus for deforming a plurality of planar spring elements such that each element produces a precise load upon deflection to a particular position, and in particular, to bending load/support arms which resiliently support "flying" read/write heads of magnetic disk drive systems above the spinning disk.

2. Description of the Prior Art

Efforts to improve magnetic disk drive data storage systems ultimately focus on increasing the density of data recorded or stored in the media of the disk. The interaction between the recording heads and the disk media has been described as "where the tire meets the road" in the race to increase data storage density.

However, the recording or read/write heads of such systems do not actually touch the surface of the media spinning below, but rather, fly on air bearings gimbaled to a support or suspension arm extending from carriage structures. Storage density is inversely related to the height which the head flies above the spinning surface of the depth, i.e. lower flying height means greater storage density. The typical flying heights of the air bearing above the spining media is on the order of micrometers and nanometers, i.e., $10^{-6}$ to $10^{-9}$ meters. Such small distances mean that achievable storage density in any disk drive system is critically dependent on the element supporting the flying head above the spining surface of the disk, or "the suspension holding the tire to the road."

The support arm to which the flying head is gimbled provides primary suspension for resiliently counter balancing aerodynamic forces driving the air bearing away from the surface of the spining disk. Such support arms typically include a base, a flexure section, a relatively ridged beam section and a tip. The gimble mount attached to the flying head is secured at the tip of the support arm, and a mounting or reinforcing block is secured at its base.

The flexure section is typically bent to provide an angular relationship between the beam and base sections when the arm is not constrained. When the support arm is secured to a carriage of a disk drive, the flying head gimbled at the tip of the arm initially bears inwardly against the surface of the disk media straightening the angle of the flexure section. Upon spinning the disk, the head lifts to flying height further straightening the flexure section. The inward force imparted to the flying head by the support arm is typically referred to as the "gram load," and is measured in the cgs system). The gram load imparted by the arm to the flying head at flying height is controlled by both the degree and nature of the bend in the flexure section of the arm.

It is desirable to have a reliable and repeatable process for precisely bending the flexure sections of a large quantity of such support arms such that each arm will impart a known gram-load to a flying head at flying height when incorporated into a disk drive.

SUMMARY OF THE INVENTION

A manufacturing system is described for sequentially bending a plurality of planar spring elements extending from a regularly perforated bar or fret, then adjusting the resiliency of each element to provide a precise load upon deflection to a specified position, and finally shearing only those elements meeting the selected deflection/load criteria from the fret.

The invented system includes a measuring station, a radius forming (bending) station, a thermal adjust station, a shear station, a walking beam transport system between the stations, and incorporates a microprocessor which both obtains processing data from and controls each of the stations while simultaneously monitoring the transport system. An oven can be incorporated into the walking beam transport system between the radius forming and thermal adjust stations for stress relieving the formed (bent) spring elements before adjustment.

Particular novel features of the invented system include:

(1) A translating shuttle mechanism with a plurality of parallel rails for loading frets onto the walking beam transport system;

(2) Non-shock linear cam actuators for moving load cells into engagement each spring element at its bearing point, the load cells sensing gram load as a function of deflection of the spring element;

(3) A resilient deflecting guard mechanism protecting the gimble mount secured at the tip of the load/support arm as the sensor head of a load cell translates into engagement with the tip of the spring element deflecting it upwardly to the "flying position."

(4) A precision bending mechanism wherein a pair of pivotably mounted and orthogonally related linear bearing races support carriages translated in the races by a pair of orthogonally related linear actuators for rolling a bending element around a cylindrical mandrel.

A primary novel aspect of the invented system is the process implemented by the apparatus wherein the microprocessor (computer) while directing the advance of spring element frets through the system, controls the steps at the respective stations of:

(a) measuring thickness of each planar spring element, or more particularly, the thickness of each flexure section of a disk drive support arm fret;
(b)) successively:
 (i) bending each flexure section;
 (ii) deflecting each arm to an anticipated "flying" position; and
 (iii) monitoriong gram-load imparted at the bearing point of that deflected arm,
 until the gram-load imparted is a known quanta above specification;
(c) stress relieving an entire fret of arms;
(d) again deflecting each arm to its anticipated "flying" position; and,
(e) while monitoring gram-load at the bearing point of the deflected arm, successively:
 (i) heating its flexure section decreasing the gram-load to a set value; and
 (ii) then cooling the flexure section of that deflected arm,
 until a desired recovery of gram-load is imparted at the bearing point of the arm; and
(f) shearing each load arm meeting the desired deflection/gram-load criteria from the fret leaving those that do not with the fret.

Other novel aspects of the invented system relate to a modular mounting frame and modular walking beam transport units allowing additional processing stations to be incorporated into the system with out affecting the dimensional logic of the processing program.

An advantage of the invented system relates to pneumatic actuation of its moving parts making the system particularly amenable to digital control.

Still other novel features, aspects and advantages of the invented system for manufacturing disk drive load/support arms with a precisely known gram-load upon deflection to a "flying" position are more readily apparent, and fully described with reference to the following detailed drawings and description of a preferred and exemplary embodiment of the system.

DESCRIPTION OF THE FIGURES

FIGS. 2a and b depict a typical support/load arm for carrying a "flying" head in a disk drive data storage system.

FIG. 4 is a side elevation view illustrating the linear cam actuator raising the load cell into engagement with the bearing point of the support arm.

FIGS. 5a, b and c illustrate the arrangement of the bearing races and pneumatic actuators driving the rolling bending element which actually bends the flexure sections of the support arms.

FIG. 6 is a cross-section view of the thermal adjust station.

DESCRIPTION OF THE PREFERRED AND EXEMPLARY EMBODIMENT

Figure 8:
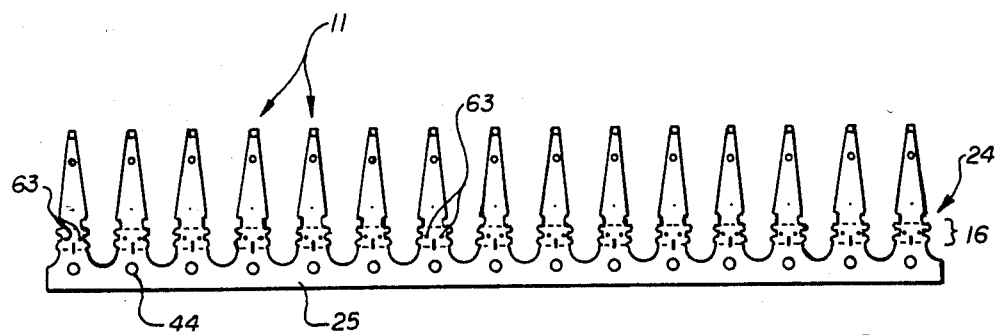
FIG. 8 is a top view of an exemplary assembled fret of support/load arms for input into the manufacturing system.

Referring to FIGS. 2 and 8, the load/support arm 11 includes three pieces welded together, a load arm 12, a base block 13 and a gimble mount 14, and has three structural sections, a base 16, a rigid beam section 17 and a flexure section 18 joining between the base and beam sections. The gimble mount 14 is welded at the tip of the rigid beam section 17 and basically comprises a frame 19, a mounting tongue 21 within the frame 19 joined at one end to the sides of the frame 19 and a convex boss 22 centrally located on the tongue engaging the tip of the beam section 17 of the load arm 11. The point at which the boss 22 engages the tip or end of the beam section of the load arm is referred to as the bearing point 23 of the load/support arm 11.

FIG. 8 shows a fret 24 of load/support arms 11 ready for input into the invented manufacturing system. The fret 24 has already passed through several stages of the manufacturing in which the gimble mounts 14 and the base mounts 16 are welded to the load arms 12 typically using a laser beam welder.

Figure 1:
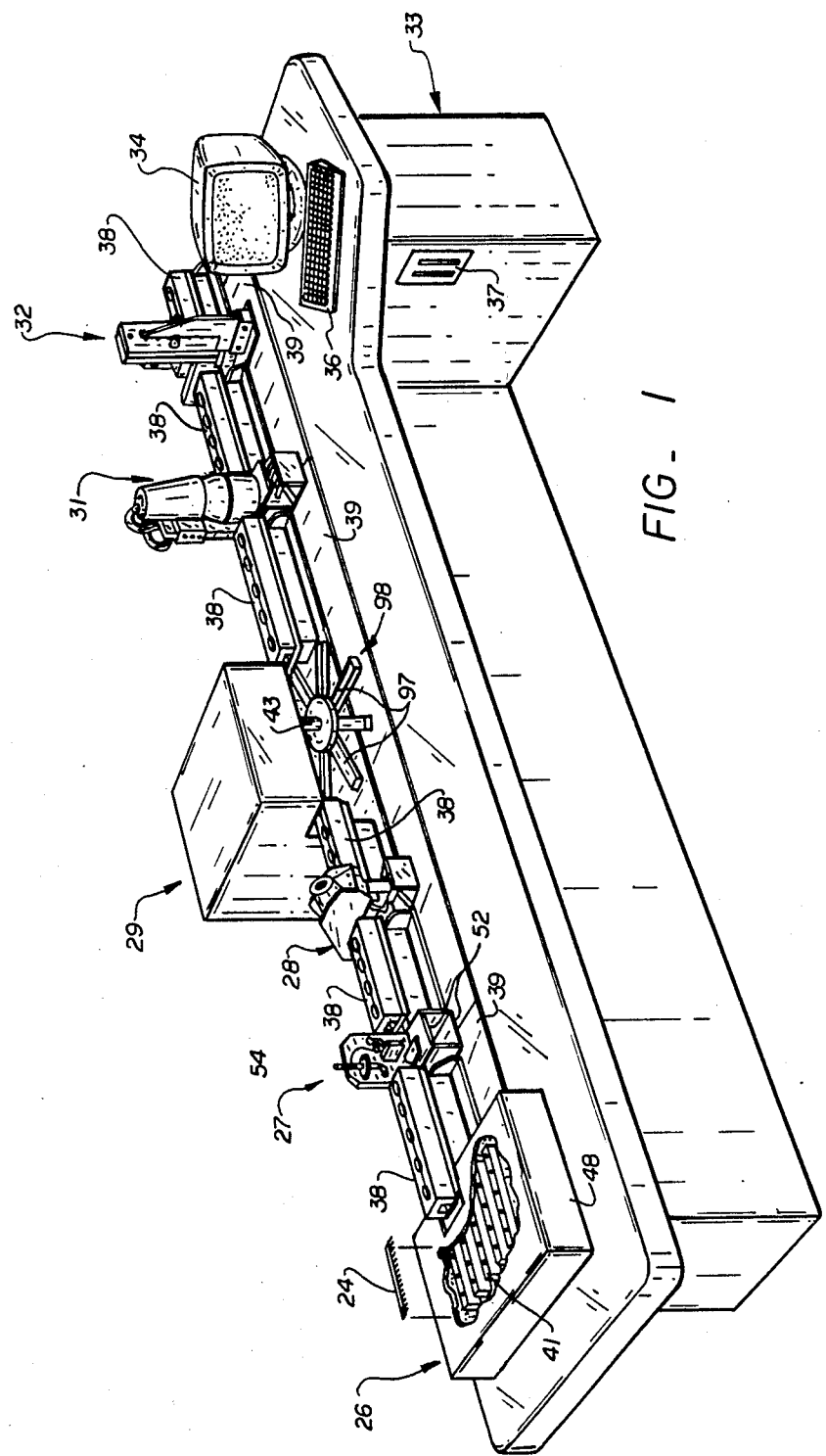
FIG. 1 is a perspective view of the entire system illustrating the relationship of the respective work stations.

The invented manufacturing system illustrated in FIG. 1 includes, from input to output, a shuttle 26, a measuring station 27, a radius forming station 28, a stress relieving oven 29, a thermal adjust station 31, a shear station 32 and a computer or microprocessor 33 having a video display 34, a keyboard 36 and a program/data storage/input unit (disk drive) 37. Modular walking beam transport units 38 are located between the respective stations. The stations and the modular walking beam units 38 are all bolted onto a modular mounting frame 39.

The system shown in FIG. 1 is pneumatically driven. The pneumatic valves, supply lines and exhaust lines to the various pneumatic actuators of the system are not shown. In general, each pneumatic actuator of the system is coupled to a source of gas pressure through an input valve and to an vent valve. The microprocessor/computer 33 controls the input and vent valves to the pneumatic actuators.

Except as otherwise described, the pneumatic (fluidic) logic for the valves controlling the actuators is binary, i.e., open or closed. Similarly, the logic of the actuators is binary, i.e., fully extended or fully retracted.

Both the processes and the electro-mechanical mechanisms by which a microprocessor/computer implements control over a binary pneumatic (fluidic) actuated systems are generally well known, and a detailed description of such processes and electromechanical devices is not thought necessary for a clear understanding of the invented system.

As shown in FIG. 1, a plurality of frets 24 of load/support arms 11 (see FIG. 8) are placed on the feed benches 41 of the shuttle 26. The feed benches 41 of the shuttle 26 are then sequentially aligned with the first modular walking beam transport unit 38 which incrementally advances the frets 24 from the feed benches 41 and transports it to the measuring station 27. At the measuring station 27, the thickness of each flexure section of each load arm 12 is determined. As the frets 24 incrementally advance through the measuring station, they are received by a second modular walking beam transport unit 38 which transports them to the radius forming station 28. At the radius forming station 28, the flexure section 18 of each load arm 12 is precisely bent such that when the arm is deflected upwardly to its normal flying position, it provides a gram/loading greater than that ultimately desired. A third modular walking beam unit 38 receives the frets 24 as they incrementally passes through the radius forming station 28, and transports them to oven benches 97 connected to a rotating shaft 43 which rotates the benches 97 through the stress relieving oven 29. A fourth modular walking beam unit 38 receives the frets 24 from the oven benches 97 as they rotate out of the oven and conveys them to the thermal adjust station 31 where the gram/load imparted at the bearing point 23 of each load/support arm 11 is measured and adjusted downwardly by stress relieving only the flexure section 18. A fifth modular walking beam unit 38 receives the frets 24 as they incrementally passes through the thermal adjust station 31 and conveys them to the shear station 32. At the shear station, each load/support arm 11 which meets the specific design criteria of deflection and gram/load is sheared from the frets 24. Those load/support arms 11 which do not meet the specified criteria are left with the frets 24 and discarded. The determination of whether or not a particular load/support arm 11 meets the specified design criteria is made by the microprocessor 33 at either the measuring station 27, the forming station 28 or the thermal adjust station 31.

In more detail, the shuttle 26 consists of five identical feed benches 41 defining a surface for receiving the frets 24 of the load/support arms 11. The longitudinal bar system 25 of each fret 24 includes a series of regularly spaced and aligned index holes 44 (FIG. 8). For example, the index holes 44 can be spaced in alignment with the center line of each load/support arm 11 extending perpendicularly from the fret bar 25 (see FIG. 8). The bench 41 includes two index pins spaced for penetrating through the index holes 44 in the fret bar 25.

Figure 7A:
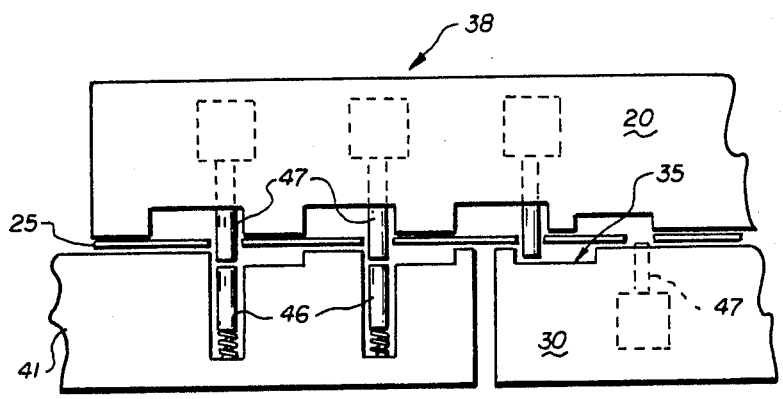
FIGS. 7a, b and c are enlarged views of exemplary sections of the "walking beam" transport units of the system.

In more detail, referring to FIG. 7a, the index pins 46 for benches 41 are spring-loaded. When a bench 41 is aligned beneath the input end of the first modular walking beam transport unit 38, its index pins 46 are aligned directly beneath pneumatically actuated pins 47 of the walking beam unit at its first translation position. The pneumatically actuated pins 47 of the walking beam unit 38 descend pushing down the index pins 46 of the feed bar. The walking beam 38 is then pneumatically translated to its second translation position whereupon the pins 47 retract. At the second translation position, the index pins 46 of the bench again align with and penetrate into index holes 44 through the fret 26. With the pneumatically actuated pins 47 of the first walking beam unit 38 retracted, the beam 38 translates back to its first translation position whereupon the cycle repeats until the entire length of the fret is conveyed from the feedbar 41 into the first walking beam unit 38.

Figure 7B:
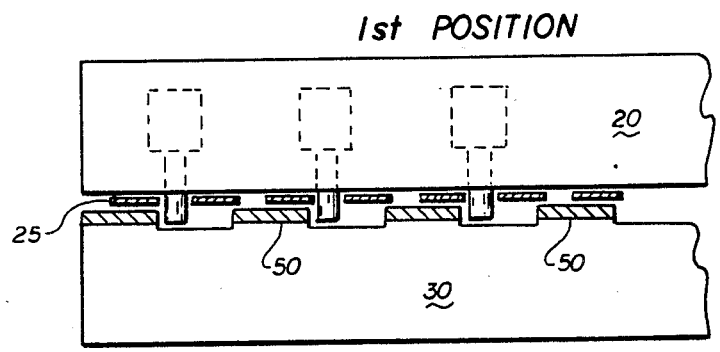
Figure 7C:
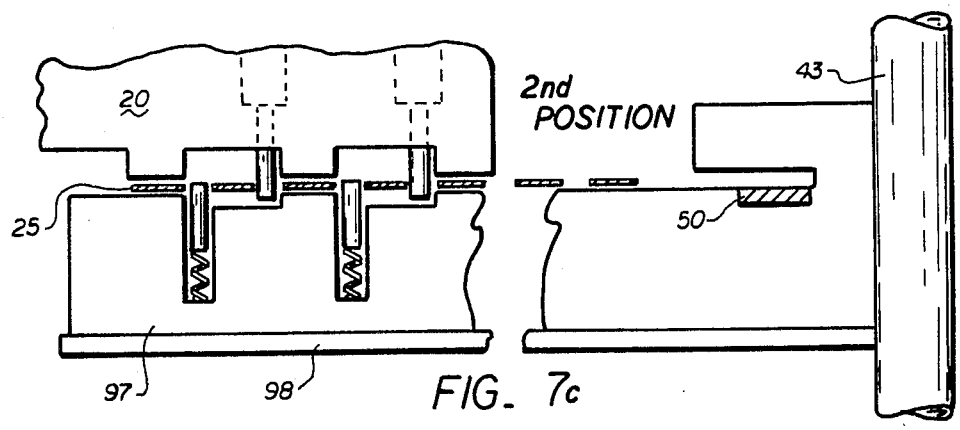

In general, the length of the modular walking beam transport units 38 should be greater than or equal to the maximum length of frets 24 expected to be processed by the invented system. With reference to FIGS. 7a through c, the walking beam units each include a translating bar 20, movable between a first and a second translation position above stationary bench 30. The translating bar 20 includes a number of downwardly extending, pneumatically actuated pins 47 spaced for piercing through the index holes 44 of the fret bar 25. The bench 30 may also include at least one pair of upwardly extending, pneumatically actuated pins 47 also spaced for piercing the index holes 44 through the fret bar 25 (FIG. 7), or other type of passive or active mechanism 50 for holding the fret bar 25 in position as the translating bar 20 moves from the second position back to the first position with it pins 47 retracted. Both the bar 20 and the bench have elongated wells 35 cut into their respective facing surfaces for accommodating the ends of the pneumatically actuated pins 47 extending through the index holes 44 of the fret 24 when actuated so that the translating bar 20 may translate unencumbered between the first and second positions.

In operation, the fret 24 lies on the flat surface of the bench 30 and, with the translating bar 20 at its first position, its pins 47 are pneumatically extended through and the pins 47, if any, of the bench 30 are pneumatically retracted from the index holes 44. The translating bar 20 is then moved pneumatically or otherwise to the second position translating the fret 24 longitudinally one step whereupon its pins are retracted from and the pins of the bench unit 30 are extended through the index holes 44. The translating bar 20 then is moved back to the first position and the cycle is repeated.

The distance of travel between the first and second positions should equal or be a whole multiple of the distance between the index holes 44 through the fret bar 25.

Figure 9:
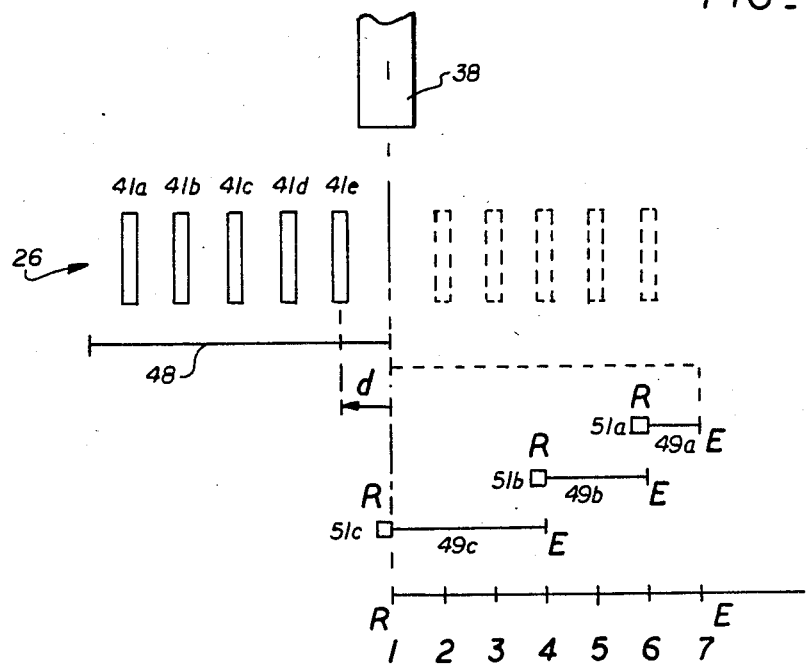
FIG. 9 is a diagram illustrating operation of the shuttle load mechanism.
Figure 10:
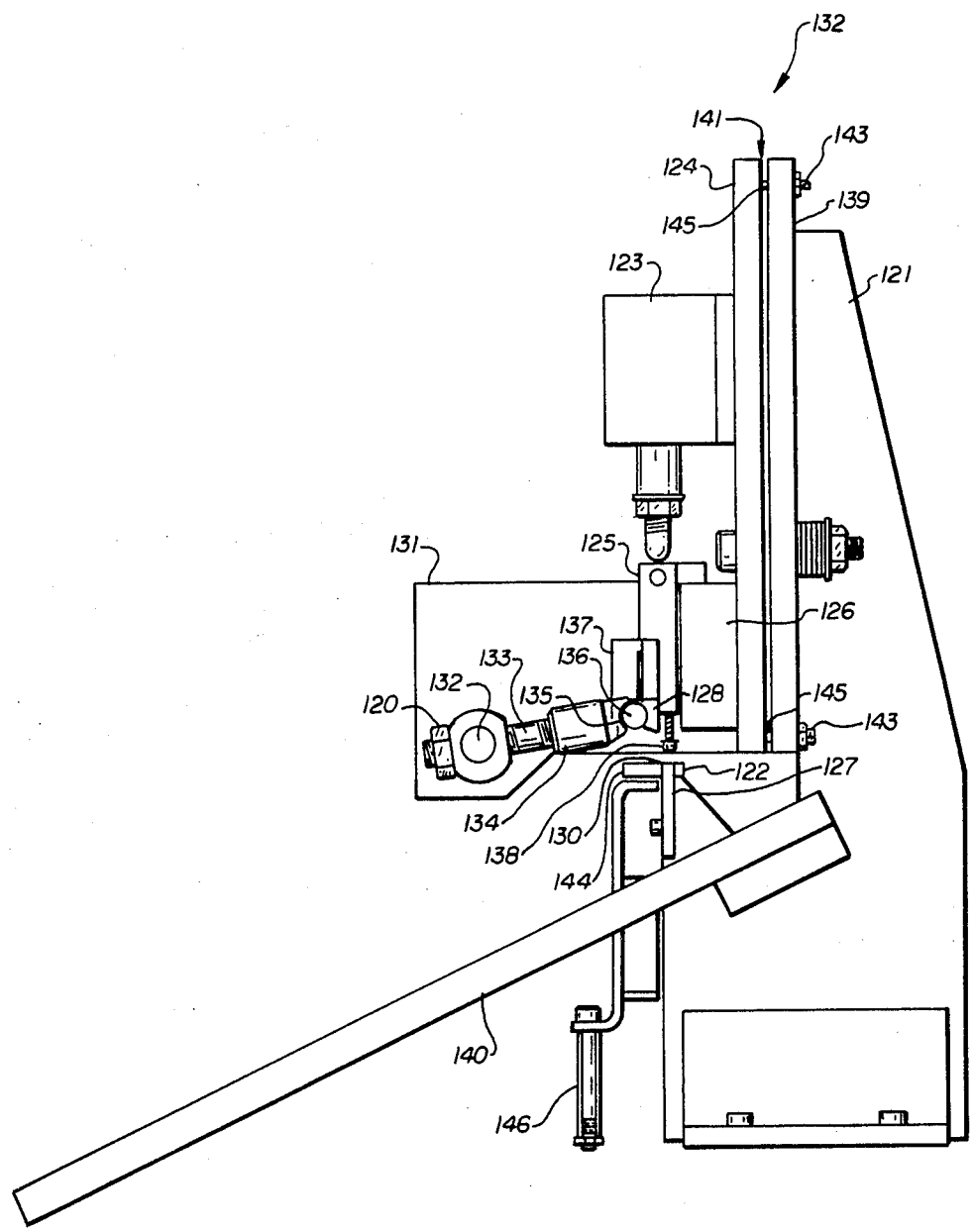
FIG. 10 is a cross-section view of the shear station.

After a fret 24 has been removed from a feed bench 41 by the first modular walking beam unit 38, the shuttle 26 translates the next feed bench beneath the walking beam 38. More particularly, referring to the diagram of FIG. 9, the shuttle 26 basically includes a tray 48 to which the benches 41 are secured. The tray in turn is secured to linear bearing races 49a–c which are translated, for example, by three pneumatic actuators 51a–c. In the example given, the pneumatic actuator 51a has a reach of one unit (d), the actuator 51b has a reach of two units and the actuator 51c has a reach of three units. The tray of the shuttle 48 is secured to bearing race 49a translated by actuator 51a. The frame of bearing race 49a in turn is mounted on bearing race 49b which is actuated by actuator 51b. Similarly, the frame of bearing race 49b is mounted on bearing race 49c which is translated by actuator 51c. As illustrated by the diagram of FIG. 10, seven equally spaced positions are provided by the three actuators 51a–c translating the tray 48 on the respective bearing raises 49a–c. Five benches 41 are spaced an equal distance apart on the tray such that bench 41e is the unit distance (d) to the left of the walking beam 38 when the pneumatic actuators 51a–c are all retracted. Position one (empty) is aligned with the axis of the walking beam 38. The pneumatic actuators 51a–c are then sequentially extended stepping the benches 41a–e past the walking beam input 38 until the actuators 51a–c are fully extended to position 7 (also empty) at which bench 41a is the unit distance (d) to the right of the walking beam input 38. (The position of the feedbars 41a–e when the actuators 51a–c are in the extended position are shown in phantom.)

At the measuring station 27 the thickness of each flexure section 18 of each load/support arm 11 of every fret 24 is measured. In more detail, the measuring station includes 27 a stage 52 at exactly the same elevation as the benches 30 of the first and second walking beam units 38 on either side. A linear variable differential transformer transform (LVDT) probe 54 is located above the stage 52. The LVDT probe 54 is actuated or moved by a vacuum cylinder (not shown) in which a spring biases the probe in a "normally down" or "engaged" position. The cylinder is evacuated using a conventional aspirator whereupon atmospheric pressure translates the piston upward in the cylinder compressing a spring lifting the tip of the probe from the stage.

The LVDT probe 54 is first calibrated by placing a calibration shim having a known thickness (T) on the stage 52 and lowering the tip of the probe 54. The point where the tip of the probe 54 engages the surface of the calibration piece and provides an electrical signal which is electronically set as the "zero point" for the instrument. This means that in all subsequent down positions of the probe engaging the surfaces of the respective flexure sections 18 of the load arms 12 either have a greater or "positive" thickness providing a positive electrical signal or a less or "negative" thickness providing a negative electrical signal relative to the thickness of and signal provided by the calibration shim. The respective thicknesses of each flexure section 18, or rather, the LVDT electrical signals are received and stored by the microprocessor/computer 33. The fret 24 is then transported by the second walking beam unit 38 to the radius forming station 28.

Figure 3A:
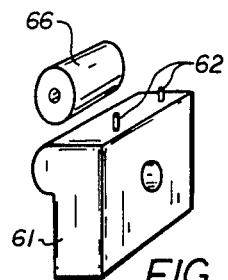
FIG. 3 is a cross-sectional elevation of the radius forming station showing the mechanism for bending a flexure section of a support arm around a cylindrical mandrel and pneumatically actuated load cell for sensing the resulting gram-load imparted at the bearing point of the support arm after bending.
Figure 3:
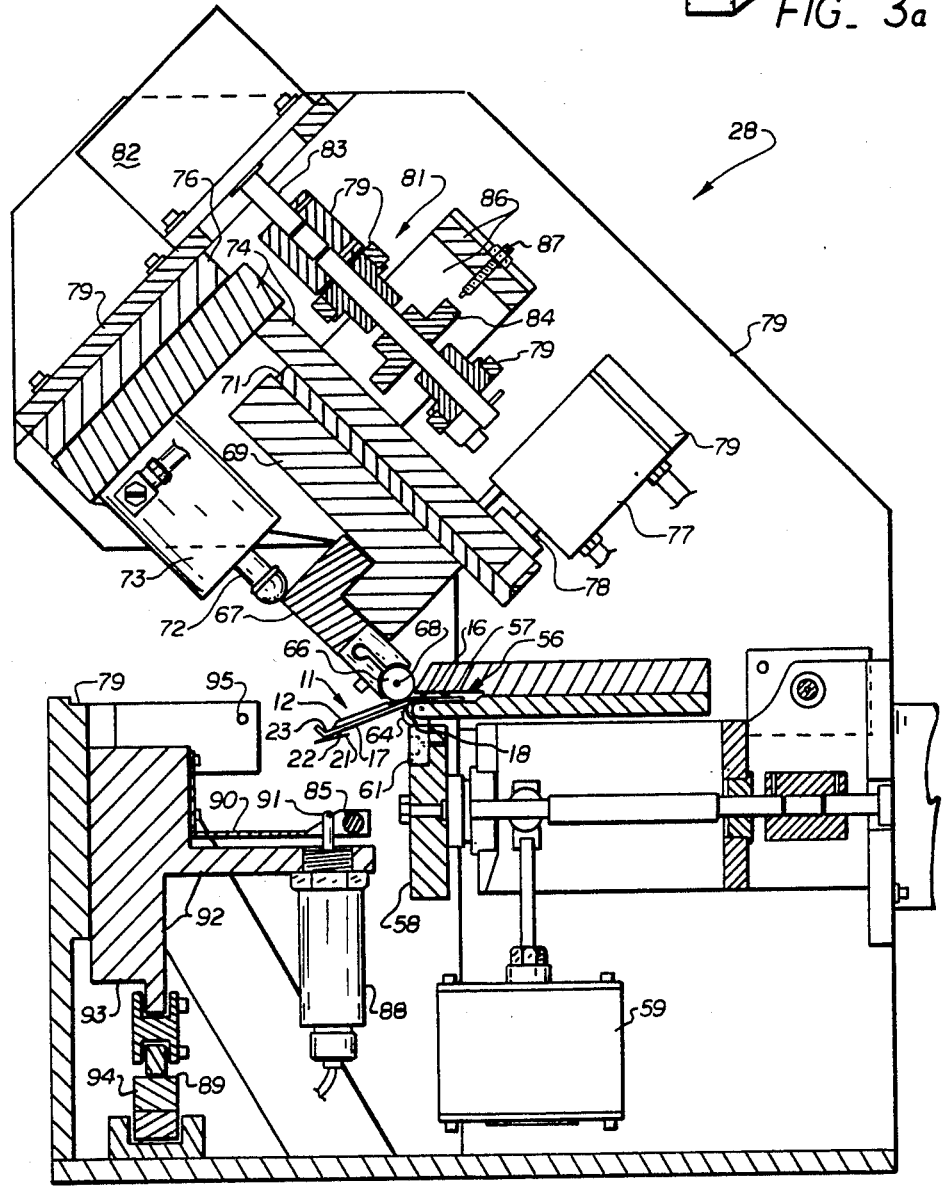

Referring to FIGS. 3 and 4, the radius forming station 28 includes a clamping stage 56 for rigidly clamping the base 16 of the load/support arm 11 between a stationary bar 57 and a translating mandrel carriage 58 actuated by a pneumatic actuator 59 which raises and lowers the carriage 58.

A removable mandrel 61 is secured to the carriage 58, the mandrel 61 includes a pair of registry prongs 62 extending from its upward surface adapted to extend through a pair of holding holes 63 through the base 16 of the arm 1 (FIG. 8). The tips of the registry prongs 62 are received by corresponding receptacles in the bottom face of the stationary bar 57 of the clamp stage 56. Accordingly, when the mandrel carriage 58 is translated upward by the pneumatic actuator 59, the base 16 of the load/support arm is securely clamped in a fixed relationship with regard to a forming surface 64 of the mandrel 61.

Under normal circumstances, the forming surface 64 of the mandrel 61 is cylindrical with an axis aligned parallel to the fret bar 25, i.e., perpendicularly with respect to the centerline of each load/support arm 11. However, as is discussed infra, for some applications, the axis of the cylindrical forming surface 64 of the mandrel 61 may be oriented at an angle other than 90 degrees with respect to the centerline of a load/support arm 11. Also, the curve of the planar forming surface 64 of the mandrel may be ellipsoidal hyperbolic, or parabolic, rather than cylindrical. The essential criteria for the forming surface 64 is that it be essentially planar in an axial dimension and smoothly curving in a "downward" or perpendicular dimension to such axial dimension such that the cylindrical roller 66 can roll around the forming surface.

Also, the mandrel carriage 58 may carry several different mandrels with different forming surfaces. In such an instance, the mandrel carriage may include a rotating stage with a mandrel 61 located at each stage position. Such stage could be rotated by a stepping motor carried by the carriage 58.

In operation, frets 24 of load/support arms 11 are received from the second walking beam unit 38. The mandrel carriage 58 translates upward successively securing the base 16 of each load/support arm 11. When clamped in place, the flexure section 18 of the load arm is located directly above the curved forming surface 64 of the mandrel 61. The flexure section 18 of each support arm 11 is then bent around the forming surface 64 of the mandrel 61 by a cylindrical bending roller 66 having a rotational axis parallel to the longitudinal axis of the forming surface 64.

In particular, the bending roller 66 rolls around the forming surface 64 with the flexure section 18 of a particular load arm 11 sandwiched between the roller 66 and the mandrel surface 64. The bending roller 66 rotates on a shaft 68 journalled in a removable chuck 67. The chuck 67 mounts on a carriage frame 69 which in turn translates in a linear bearing race 71 at an angle of 135 degrees relative to the plane of the clamping stage 56. An actuator arm 72 of a pneumatic actuator 73 also oriented at an angle of 135 degrees relative to the plane of the clamping stage 56 engages a surface of the removable chuck 67 for translating the linear bearing race 71 carrying the carriage frame 69 downwardly. The bearing race 71 and the actuator 73 are in turn mounted on a common carriage frame 74 which in turn translates in a second linear bearing race 76 oriented perpendicularly (orthogonally) relative to the translation of a lionear bearing race 71 and at an angle of 45 degrees relative to the plane of the clamping stage 56. The carriage frame 74 is translated in the bearing race 76 by a second pneumatic actuator 77 having an arm 78 translating perpendicularly with respect to the actuator arm 72 of the actuator 73.

As illustrated in FIGS. 5a, b and c, the axis of the actuator arm 72 of the pneumatic actuator 73 intersects the rolling axis of the bending roller 66 and accordingly, imparts a force essentially perpendicular to the forming surface 64 of the mandrel 61. The angular degree which the bending roller 66 rolls around the forming surface 64 is controlled by limiting the extension of arm 78 of pneumatic actuator 77. A small compressive force is imparted by actuator 77 for driving the bending roller 66 against the forming surface 64. The angular degree which the bending roller 66 rolls around the forming surface 64 of the mandrel 61 determines the degree of bend imparted to the flexure sections 18 of the arms 11.

The degree which the bending roller 66 rolls around the forming surface 64, the mandrel 61, is controlled by limiting translation of a carriage frame 74 and bearing race 76. In particular, the linear bearing race 76 carrying the carriage frame 74 is secured in an overall station frame 79. Also secured to the station frame 79 is an adjustable stop mechanism 81 for limiting translation of the carriage frame 74 on the bearing race 76 which includes a stepping motor 82 secured to the station frame 79 rotating a shaft 83 carrying a cam 84. The carriage frame 74 includes a U-shaped frame 86 encircling the cam 84 having a stop adjustment screw 87 located for engagement with the surface of the cam 84. Accordingly, the degree of translation of the carriage frame 74 on the linear bearing race 76 is coarsely controlled with the screw 87 and finally controlled utilizing the stepping motor 82 rotating the shaft 83 carrying the camming surface 84. In this fashion, the angular degree which the bending roller 66 rolls around the forming surface 64 of the mandrel can be precisely determined and controlled by digital signals from the microprocessor/computer 33.

The flexure section 18 of each load/support arm is bent or trained around the forming surface 64 of the mandrel 62 so that the beam section 17 and the load arm 12 is inclined angularly downward with respect to the plane of the clamping stage 56. At some point, the orthogonal actuators driving the bending rollers 66 are retracted. (The linear bearing races 71 and 76 each have a spring return (not shown) such that the bending roller is "normally disengaged".) A load cell 88 is translated upwardly by a pneumatically actuated linear cam 89 (see FIG. 4) such that its sensing head 91 engages the mounting tongue 21 of the gimble mount 14 directly below the boss 22. The pneumatically actuated linear cam 89 continues to raise the load cell 88 until the sensing head 91 supporting the tip of a load arm 12 via the boss 22 of the gimble mount 14 deflects the just bent load arm 11 from the bent position upwardly to a "flying" position, i.e., the specified position which the load/support arm 11 is designed to be deflected when mounted in a disk drive system for carrying a flying read/write head above a spinning disk. The load cell 88 generates an electrical signal which is related to the gram-load or force impart to and sensed by its sensing head 91 deflecting the load/support arm 11.

In more detail, the load cell 88 is secured in a load cell carriage frame 92 which in turn translates up and down on a vertical bearing race 93 mounted on the station frame 79. The load cell carriage frame 92 includes a cam follower roller 94 rolling on a surface 96 of a linear cam 89. The surface 96 of the linear cam 89 curves gradually upward at the beginning of its travel and at the end of its travel. Accordingly, the sensing mechanism of the load cell 88 does not experience sudden loading and unloading as it moves into and out of position for sensing load imparted at the bearing point of a particular load support arm 11. In fact, the linear cam 89 translates the load cell carriage 92 from the down position to the up position without any between positions, thus preserving the binary logic of the system.

A deflecting guard mechanism also protects the gimble mount 14 secured at the tip of the load/support arm 11 as the sensing head 91 of the load cell 88 as it is translated upwardly deflecting the tip of the arm to an expected "flying" posture. In particular, the load cell carriage 92 also includes a guard rod 85 supported on the distal end of an extending resilient bracket 90. The guard rod 85 is positioned to engage the beam section 17 of the load/support arm before the tip of the sensing head 91 of the load cell 88 engages the tongue 21 below the boss 22 of the gimble 14. A deflecting arm 95 secured to station frame structure is located for intercepting and deflecting the bracket 90 downwardly just as the linear cam 89 translates the load cell to its full up position. Since the slope of the liner cam surface is gradual at the end of its travel, the guard rod 85 is slowly deflected downward at the distal end of the bracket 90 allowing the sensing head 91 to gradually assume support of the now deflected load/support arm 11 below the bearing point 23.

When the load cell 88 is translated to its up position, the sensing head 91 supports the tip of the load/support arm 11 via the boss 22 on the surface of the tongue 21 of the gimble 14. Ideally, the arm 11 is deflected to the anticipated "flying position".

Electrical signals generated by the load cell 88 indicating the gram-load imparted by the deflected load/support arm 11 are monitored by the microprocessor/computer system 33. If the gram-load imparted to the sensing head 91 is below a specific magnitude, the load cell may be translated back to its down position whereupon that particular flexure section 18 may again be bent around the forming surface 64 of the mandrel 61 by the bending roller 66. In such cases, the load cell 88 would be again translated to its raised position and the gram-load imparted by the load/support arm 11 at its bearing point again monitored. The process can be repeated until the gram-load imparted by the load arm to the sensing head 91 of the load cell 88 is at desired quanta above a value specified by design criteria. Also if a desired above specification gram-load is not obtained after one or more forming passes by the bending roller 66, that particular load/support arm 11 could be identified by the microprocessor 33 as defective. In either case, the load cell 88 is translated to its down position and the walking beams 38 cycled to translate the fret 24 one step increment and the cycle repeats itself with the next load/support arm 11 on the fret 24.

As previously pointed out, in most instances, the rolling axis of the bending roller 66 and the axis of the forming surface 64 of the mandrel 61 are oriented orthogonally relative to the centerline of the load/support arms 11 extending from the clamping stage 56. In fact, care must be exercised to maintain the rolling surface of the cylindrical bending roller 66 in uniform contact with the flexure section sandwiched between it and the forming surface 64. To accomplish this, the frames of the orthogonally related bearing races 71 and 76 are each pivotally attached to the carriage and station frames 74 and 79 respectively, as shown in FIGS. 5b and 5c.

In particular, race 76 pivots about an axis which orthogonally intersects the rolling axis of the bending roller 66 at its centerpoint. Race 71 pivots about an axis perpendicular to the pivoting axes of race 76 in a plane which orthogonally intersects the rolling axis of roller 66 at its center point. Accordingly, by suitable pivoting adjustment of the respective bearing races 71 and 76, the rotational axis of the bending roller 66 can be aligned parallel to the axis or the forming surface 64.

It should also be appreciated, that the forming surface 64 can have a curved configuration with an axis angularly related to the plane defined by an unbent flexure section 18 of a load arm and/or angularly related to the centerline of the load/support arm 11. By suitable pivoting adjustments of the bearing races 71 and 76, the rolling axis of the bending roller can be made parallel to that of such a forming surface. In this manner, helical bends can be made to the flexure sections of the load arm. Given appropriate design criteria, such helically bent flexure sections can impart a torsional support component for restraining the flying read/write head above a spinning disk.

The frets 24 are transported from the radius forming station by the third walking beam unit 38 and placed on a oven bench 97 which carries the fret 24 through the stress relieving oven 29.

In particular, referring back to FIG. 1, the oven benches 97 are essentially identical to the feed benches 41 of the shuttle 26, with a pair of index pins positioned to engage the index holes 44 through the fret bar 25. The oven benches 97 are secured on a rotating tray 98 which rotates a plurality of radially oriented oven benches 97 through the stress relieving oven 29. In the embodiment illustrated, each fret remains in the oven for as long as it takes the tray to rotate 180° degrees to where a fourth walking beam unit 38 transports the fret from the oven benches 97 to the next processing station.

It should be appreciated that the third and fourth walking beam units need not be aligned as illustrated in FIG. 1, but could be aligned with any angular rest positions of the tray 98. A rest position occurs when a oven bench 97 is aligned with the third walking beam unit 38 for receiving a fret from the radius forming station 28.

In fact, it is possible and maybe even desireable to eliminate the stress relieving oven from the pneumatically actuated system for processing the load arms. In such case, frets 24 of the now bent frets of load/support arms 11 would be collected at the output of the third walking beam unit 38 and manually placed into an oven for stress relieving treatment. The frets 24 of bent load/support arms 11 after being stress relieved would then loaded onto benches 41 of a second shuttle 26 feeding a walking beam transport unit 38 for conveying the bent and stress relieved frets 24 of load/support arms 11 to the thermal adjust station 31.

The thermal adjust station 31 shown in FIG. 6 includes a conventional infrared source (not shown) positioned above a shutter stage 102, the infrared source is located at one focus of an ellipsoidal reflector 103. The remaining focus of the ellipsoidal reflector 103 is located in the plane intercepted by a deflected flexure section 18 of a load/support arm 11 clamped to the shutter stage 102.

The shutter stage 102 includes a shutter 104 translated by a pneumatic actuator 105 opening and closing a port 106 communicating with the interior of the ellipsoid reflector 103 for the infrared source 101. The longitudinal bar 25 of the fret is received in a slot 107 within the stage below the shutter port 106. A translating clamp carriage 108 actuated by pneumatic actuator 109 translates upwardly to clamp the base 16 of the load/support arm 11 to the shutter stage. The clamp carriage 108 includes a pair of spaced apart prongs 109 adapted to be received by the holding holes 63 through the base 16 of the load/support arm 11.

A load cell 110 mounted on a carriage frame 111 is then raised by a pneumatically actuated linear cam 112 such that its sensing head 113 engages the mounting tongue 21 of the gimble 14 just below the convex boss 22 abutting against the tip of the load arm 12. The carriage frame 111 carrying the load cell 110 the linear bearing race 114 and the pneumatically actuated linear cam raising and lowering the carriage 111 are essentially identical in structure and function as the load cell assembly at the radius bending station 28. There is also a deflection guard rod 90 supported at the distal end of a bracket for protecting the sensing head 113 of the load cell 110.

The pneumatically actuated linear cam 112 raises the load cell assembly to the up position deflecting the tip of the bent and stress relieved load/support arm 11 upwardly to a "flying position" at which the arm is expected to be deflected when carrying a flying read/write head above a spinning disk. The computer/microprocessor 33 continuously monitors electrical signal from the load cell 110 indicative of the gram-load imparted by the deflected arm 11.

At the thermal adjust station 31, the gram-loads imparted by the deflected load/support arms 11 are adjusted downwardly by stress relieving only the flexure sections 18 of the load arms 11. Specifically, translating the shutter 104 opening the port 106 communicating to the inside of ellipsoidal reflector 103 exposes the flexure section 18 of a particular load/support arm 11 to infrared radiations heating it to provide specific local stress relief as the flexure section 18 warms, the gram-load imparted at the bearing point of the arm 11 decreases, which decrease is sensed or monitored by the computer/microprocessing system. When the gram-load has decreased to a particular quanta or set point, the shutter 104 is translated back across the port 106 isolating the infrared source 101 from the flexure section. The flexure section then begins to cool and, the gram-load imparted at the bearing point of the arm 11 increases or recovers. The magnitude of recovery of the gram-load imparted at the bearing point 22 of the load/support arm 11 as the flexure section cools is predictable.

Specifically, when essentially identical elements or pieces are manufactured and/or formed using identical or essentially identical processes, they will respond similarly, if not identically, to events affecting their mechanical properties. The frets 24 of load/support arms 11 are all subjected to essentially the same manufacturing and forming processes. The infrared source at thermal adjust station 31 providing specific local stress relieve effectively "tweeks" the mechanical properties of the load/support arms 11 in a predictable and repeatable fashion. The response of the arm 11 to such "tweeking" is similar. After monitoring the responses of a large number of similar processed arms 11, it is possible to statistically predict with a substantial degree of precision, the manner in which a properly manufacture and processed load arm 11 should respond or recover after being "tweeked" by the infrared source.

Accordingly, at the thermal adjust station 31, the computer/microprocessor 33 continues to monitor the output of load cell 110 as the flexure section 18 cools. If the response or recovery of gram-load seen by the processor 33, conforms to that statistically predicted for an "acceptable" part, then the walking beam system is cycled and the next load arm 11 is processed. If the part does not respond properly, it is possible to again "tweek" or stress relieve the flexure section 18 such that the gram-load imparted at the bearing point to the load cell monitored by the processor 33 again decreases to another set point value. The recovery of gram-load imparted at the bearing point of the arm 11 through the load cell 110 is again monitored by the processor 33. If the recovery is proper, the transport system is cycled for processing the next load arm 11 on the fret 24. If not, due to, for example, a bad weld securing the base block 13 at the base 16 or a bend in the beam section 17, the part is identified by appropriate coding in the microprocessor/computer system 33 and the transport system cycled for processing the next load/support arm 11 on the fret 24.

The set point gram-load which determines the extent of the stress relieving heat treatment of the flexure sections 18 by the infrared source 101 at the thermal adjust station 31 is determined by the desired or specified gram-loading restraining the flying read/write head for a particular disk drive system.

As previously discussed, the gram-load imparted at the radius forming (bending) station by the load/support arm is a specific quanta above specification when the arms 11 are deflected to the expected flying position. The entire fret of load arms is then stress relieved in an oven for a specific period which effectively decreases gram-load imparted by the arms 11 when deflected to the flying position. The stress relieving treatment performed at the thermal adjust station 31 on the flexure section 18 further decreases the ultimate gram-load imparted by the deflected load/support arms 11.

By experimentation (trial and error), it is possible to determine with a high degree of precision the amount of stress relieving treatment to be performed at the stress relieving station 31 on the load arms 11 to achieve the specified gram-load called for in the design of a particular disk drive system.

For example, if the gram-load imparted at the bearing point of load/support arm after an initial exposure and cooling is greater than that specified it can again be exposed for additional stress relief to decrease the gram-load of the arm. The set point is then adjusted downward before treating the next load/support arm. If the gram-load imparted by a particular load/support arm is less than that specified after treatment at the stress relieving station, the system is cycled for locating the next load/support arm extending from the fret at the station and the set point is adjusted upwardly. In fact, by appropriately programing the microprocessor controlling the system, the entire process of determining the set point for a particular batch of load/support arms can be accomplished without operator intervention, the initially treated load/support arms supplying the data necessary for establishing the set point for obtaining the specified gram-load called for.

The set point so determined would be valid only for essentially identical load/support arms 11 which are subjected to essentially the same manufacturing processes and experience essentially identical forming (bending) and stress relieving treatments. In particular, differently manufactured load/support arm and/or differently processed load/support arm will have different set points.

Referring now back to FIG. 6, since the recovery of gram-load imparted at the bearing point 23 of each load/support arm 11 is monitored by the microprocessor 33 through the load cell 101, it is necessary to maintain the stage 102 of the thermal adjust station 31 at essentially the same temperature. Accordingly, a gas cooled collar 116 is placed between the bottom of the ellipsoid reflector 103 and the shutter stage 102. The gas cooled collar 116 maintains the stage at essentially the same temperature absorbing any excess thermal energy radiating from the IR source 101 as the load/support arms 11 on the successive frets 24 are processed through the station.

The frets 24, after being completely processed at the thermal adjust station 31 are conveyed by a fifth walking beam unit 38 to the shear station 32.

Referring to FIG. 10, the shear station 32 consists of a station frame 121 which includes a lower stage 122 at exactly the same elevation as the bench 30 of the walking beam units 38. A pneumatic actuator 123 translates a shear carriage 125 in a linear bearing race 126 secured to a frame structure 125. A stationary shear blade 127 is bolted to the lower stage 122. A moving shear blade 128 is bolted to the shear carriage 124. The moving shear blade 128 translates downwardly past the shear edge 130 of the stationary shear blade 127.

The frame 124 includes a pair of parallel legs 131 extending outwardly bracketing the lower stage 122. A shaft 132 is journalled for rotation through the ends of the legs 131 about an axis parallel the shear plane defined by the stationary and moving shear blades 127 and 128. A bar 133 is perpendicularly coupled to the shaft 132 midway between the legs 131. The bar 133 includes a coupling 134 which at its distal end has a circular engagement surface 135 adapted to engage a round rod 136. The round rod 136 is clamped against the exterior face of the moving shear blade 128 by a clamp 137 which has a central relief to insure 2-point contact between the moving shear blade and the top of the clamp 137 and the rod 136. In fact, the rod 136 has a flat milled on its blade side to increase contact area with the outside face of the moving shear blade 128. The bar 133 includes means 120 for adjusting its length. The length of the bar 133 is adjusted such that, when the axis of the bar 13 is aligned in a horizontal plane at the point where the shear edge of the moving blade 128 translates past the shear edge 130 of the lower stationary blade 127, it insures proper clearance between the respective shearing edges of the upper and lower shear blade 128 and 127.

The translating shear carriage 125 includes a pair of spring-loaded feet 138 extending downwardly adapted to engage the surface of the lower stage 122 for absorbing and dissipating the kinetic energy of the carriage as the shear blades 127 and 128 engage and shear a load/support arm 11 from a fret bar 25.

The load/support arm sheared from the fret by the blade 127 and 128 drops from the lower stage 122 and is collected by a chute 140. The fret 24 is received by a sixth walking beam unit 38 as it translates past the shear station. The fret 24 and any remaining load/support arms not sheared from it are then discarded.

It should be noted that the station frame 121 includes a vertically oriented planar platform 139. The frame 124 also includes a corresponding vertically oriented planar platform 141. The respective platforms 139 and 141 are resiliently bolted together. Platform 139 includes three adjustment screws 143 arranged in a triangular configuration with rounded heads 145 projecting through its face. The angular orientation of the shear edge of the moving shear blade 128 is adjusted by appropriate adjustment of the respective heights which the heads 145 of the adjustment screws 143 project above the face of the mounting plane of the vertical platform 139. Also, the adjustment screws 143 allow the horizontal distance between the respective shearing edges of the shear blades 127 and 128 to be adjusted for the thickness and type of material to be sheared.

Finally, the lower stage 122 of the stationary frame structure 121 includes a platform 144 for supporting the longitudinal bar 25 of the fret 24 as the each load arm is sheared from it. The platform 144 recoils downwardly as the moving shear blade 128 shears a load arm from the fret. A compression spring 16 returns the platform 143 to its original position level with the benches 30 of the respective walking beam units on either side of the station.

The shear is actuated by the pneumatic actuator 123 which in turn is controlled by the microprocessor/computer 33. Since the number of steps or translation increments between the thermal adjust station 31 and any of the other stations and the shear station 32 is known, the microprocessor/computer having determined which of the load/support arm 11 meet thickness deflection and load criteria then activates the pneumatic actuator 123 when those particular load/support arms 11 are positioned between the respective shear blades 127 and 128 at the shear station 132.

The process of the invented system for manufacturing load/support arm for carrying flying read/write heads for magnetic disk drive data storage systems can be summarized as follows:

1. All of the components of the load/support arms 11 including the base block and gimble mounts are secured to a plurality of load arms 12 extending from a longitudinal fret.

2. The fret of assembled load/support arms are then placed on a shuttle and transported to a measuring station where the thickness of the flexure sections of each load arm is determined using an LVDT probe.

3. The frets of load/support arms are then conveyed to the radius forming station where the flexure sections of the respective load arms are formed or bent such that the load/support arms each imparts a gram-load at its bearing point, a specific quanta above the ultimate gram-load desired or specified for a particular disk drive system.

4. The fret of the now formed load arms is stress relieved in an oven to remove those accumulated stresses up to that point in the manufacturing process including those specific stresses induced at the forming station.

5. The fret of load/support arms are then transported to the thermal adjust station where each load arm is deflected to an expected flying position whereupon only its flexure section is heated for stress relieving that section until the load imparted to a load cell monitored by a computer decreases to a certain set point.

6. The computer continues to monitor the load imparted to the load cell at the adjust station at the bearing point of the load/support arm to determine whether it recovers according to a predicted curve. If it does, an appropriate coding is made to the program.

7. The fret is then conveyed to the shear station at which point those load/support arms which meet the thickness, deflection, and gram-load design criteria are sheared from the fret and collected.

The invented system for manufacturing load/support arms for carrying flying read/write heads in magnetic disk drive data storage systems has been described in context of a preferred and exemplary embodiment. Many variations, substitutions and modifications can be made to the invented system including making changes in various component parts of the apparatus, and even the manner in which the microprocessor controls the apparatus by use of algorithms, programs and instructions, all without departing from the spirit and the scope of the invention as set forth in the appended claims.

What is claimed is:

1. An apparatus for bending a plurality of planar spring elements extending perpendicularly at equally spaced intervals from a longitudinal fret, and shearing only those spring elements meeting a specified thickness, load, and deflection criteria from the fret comprising, in combination,
   a. a plurality of walking beam units each having means for engaging and transporting the fret in steps longitudinally, the walking beam units sequentially positioning each extending spring element along the longitudinal fret at a series of stations;
   b. a thickness measuring station located between first and second walking beam units having means for measuring the thickness of each planar spring element extending from the fret and generating a corresponding electrical "thickness" signal;
   c. a forming station located betweeen second and third walking beam units having,
      (i) a bending means for engaging and forming each planar spring element around a curved mandrel surface, and
      (ii) a first load sensing means engaging the spring element positioned at the forming station after it has been formed around the mandrel surface and released by the bending means for deflecting each spring element to a specified position and for sensing force imparted by each spring element at that deflected position generating a corresponding first electrical "load" signal,
   d. an oven station located between the third and fourth walking beam units for stress relieving the fret and spring elements extending along its length,
   e. a thermal adjust station located between fourth and fifth walking beam units having,
      (i) a second load sensing means engaging each spring element positioned at the adjust station for deflecting each spring element to the specified position, and for continuously sensing force imparted by each so deflected element generating a corresponding second electrical "load" signal, and
      (ii) a radiating means thermally heating the deflected spring element for stress relieving the deflected spring element decreasing the force it imparts to the second load sensing means,
   g. a memory controller means receiving "thickness" signals from the measuring station, first "load" signals from the forming station, and second "load" signals from the thermal adjust station for controlling:
      (i) an angular extend to which each spring element is formed around the curved mandrel surface by the bending means,
      (ii) exposure of each spring element to the radiating means stress relieving each element at the thermal adjust station, thereby, adjusting load imparted by each spring element to the second load sensing means when deflected to the specified position to the specified load if possible,
      (iii) engagement and release of each spring element by the first and second load sensing means at their respective stations, and
      (iv) stepping of the plurality of walking beam units transporting the fret longitudinally, and
   h. a shear station located between fifth and sixth walking beam units having a shear means controlled by the memory controller means for shearing only those spring elements meeting the specified thickness, load and deflection criteria from the fret.

2. An apparatus for bending a plurality of planar spring elements extending perpendicularly at equally spaced intervals from a longitudinal fret comprising, in combination,
   a. a plurality of walking beam units each having means for engaging and transporting the fret in steps longitudinally, the walking beam units sequentially positioning each extending spring element along the longitudinal fret at a series of stations,
   b. a thickness measuring station located between first and second walking beam units having means for measuring the thickness of each planar spring element extending from the fret and generating a corresponding electrical "thickness" signal;
   c. a forming station located between third and fourth walking beam units having,
      (i) a bending means for engaging and forming each planar spring element around a curved mandrel surface, and
      (ii) load sensing means engaging each spring element positioned at the forming station after it has been formed around the mandrel surface and released by the bending means for deflecting each spring element to a specified position and for sensing force imparted by each spring element at that deflected position generating a corresponding first electrical "load" signal;
   d. a memory controller means receiving "thickness" signals from the measuring station, and the "load" signals from the load sensing means for controlling:
      (i) an angular extent to which each spring element is formed around the curved mandrel surface by the bending means,
      (ii) engagement and release of each spring element by the load sensing means,
      (ii) stepping of the plurality of walking beam units transporting the fret whereby a spring element may be held at and moved from a particular station.

3. An apparatus for adjusting load imparted by a plurality of bent planar spring elements extending perpendicularly at equally spaced intervals from a longitudinal fret and shearing only those spring elements meeting a specified load and deflection criteria from the fret, comprising, in combination:
   a. a plurality of walking beam units each having means for engaging and transporting the fret in steps longitudinally, the walking beam units sequentially positioning each extending spring element along the longitudinal fret at a series of stations;

c. a thermal adjust station located between first and second walking beam units having,
  (i) a load sensing means engaging and releasing each spring element at the station for deflecting each spring element to the specified position, and for continuously sensing force imparted by each so deflected element generating a corresponding electrical "load" signal, and
  (ii) radiating means for thermally stress relieving the deflected spring element decreasing the force imparted to the load sensing means, c. a memory controller means receiving the "load" signals from the load sensing means for controlling:
  (i) exposure of each spring element to the radiating means thermally stress relieving it, thereby, adjusting load imparted by each spring element when deflected to the specified position to the specified load if possible; and
  (ii) engagement and release of each spring element by the load sensing means; and
  (iii) stepping of the plurality of walking beam units transporting the fret whereby a spring element may be held at and moved from a particular station; and d. a shear station located between third and fourth walking beam units having shear means controlled by the memory controller means for shearing only those spring elements meeting the specified load and deflection criteria from the longitudinal fret.

4. The apparatus of claims 1, 2 or 3 further including a translating shuttle mechanism for sequentially positioning a plurality of longitudinal frets for input into the first walking beam unit.

5. The apparatus of claim 4 wherein the shuttle mechanism comprises in combination,
  a. a plurality of parallel longitudinal benches mounted a unit distance D apart on a tray, each longitudinal benches being oriented for translation to a position in longitudinal alignment with the first walking beam unit, and having means for receiving and holding a fret on its bench surface,
  b. means for translating the tray in a direction perpendicular to the longitudinal orientation of the benches mounted thereon in equally spaced increments equal to the unit distance D, and wherein the first walking beam unit includes an input means receiving one end of a bench as the bench translates into alignment with it for engaging and transporting a fret held on the bench surface in steps longitudinally from the bench.

6. The apparatus as described in claim 5 wherein the means for translating the tray on which the benches are mounted comprises, in combination:
  a. a plurality of linear bearing races secured between the tray and a stationary surface;
  b. a plurality of actuator means each having an actuator arm translating a distance from a fully retracted position to a fully extended position where the translational distance for the first actuator means is the unit distance D, for the second actuator means 2D, for the third actuator means 3D, . . . , and for the nth actuator nD, where the first actuator means is mounted on the stationary surface and translates the first bearing race, the second actuator means is mounted on the first bearing race and translates the second bearing race, the third actuator means is mounted on the second bearing race and translates the third bearing race, . . . , and the nth actuator means is mounted on the (n−1)th bearing race and translates the tray carried by the nth bearing race, the memory controller means controlling each of the respective actuator means, whereby the tray can be translated in increments of unit distance D to K positions where k equals the number of unit distances D spanned when the arm of each actuator is fully extended.

7. The apparatus of claim 6 wherein the number of benches mounted on the tray equals (K−2) where the first bench is spaced unit distance D to the right of the first walking beam unit when all of the arms of the actuator means are fully retracted and where the (K−2)th bench is spaced a unit distance D to the left of the first walking beam unit when all of the arms of the actuator means are fully extended whereby a fret may be placed upon each of the bench surfaces when the arms of the actuator means are fully extended and fully retracted.

8. The apparatus of claim 7 wherein the longitudinal fret includes a plurality of equally spaced indexing holes aligned longitudinally along its length having centers corresponding to centerlines of the spring elements extending perpendicularly from the fret, the indexing holes being spaced a distance B apart, and
  wherein the ends of the benches on the tray received by the input means of the first walking beam unit each include,
    a pair of pins received within a pair of receptacles in the bench surface where the pins are spaced a distance nB apart,
    a spring being located within each receptacle below the pin for biasing the pins to extend above the bench surface, whereby a fret is held in longitudinal alignment with the bench surface by the pair of pins extending upwardly from the bench surface into the indexing holes through the fret.

9. The apparatus of claim 8 wherein the input means and the means for engaging and transporting the fret in steps of each walking beam unit includes:
  a longitudinal translating member having a series of equally spaced holes drilled through it perpendicular to its longitudinal axis, the holes being spaced a distance nB apart where n is an integer;
  a longitudinal stationary member oriented parallel to and presenting a planar face perpendicular to the holes drilled through the translating member;
  a plurality of engagement actuator means each having a cylindrical arm extending into one of the holes through the translating member, each actuator arm adapted to extend from a retracted position from within a particular hole to an extended position extending from that hole into an indexing hole of a fret on the face of the stationary member,
  a translation actuator means coupled to the translating member for translating it longitudinally from a first position to a second position a distance B from the first position and back; and
  wherein the memory controller means further includes means for controlling the engagement and the translation actuator means whereby, at input, the actuator arms of the engagement actuator means extend into the index holes of a fret on the bench surface of a bench of the shuttle mechanism pushing the pair of pins extending out from the bench surface into the index holes of the fret into their respective receptacles at the first position, the pins being held within the receptacles by the surface of the fret as the translating bar translates to the second position positioning the adjacent indexing holes above the receptacles whereupon the pins again extend above the surface of the bench and are received in the next indexing hole through the fret.

10. The apparatus of claim 9 wherein the stationary member of of each walking beam unit includes an engagement actuator means with a cylindrical arm extending from a retracted position completely within a receptical drilled into the planar face of the stationary member to an extended position extending from that receptical into an indexing hole of a fret supported on that face, whereby the fret can be held in a particular longitudinal position as the translating member of the walking beam unit translates back from its second position to its first position.

11. The apparatus of claims 1 or 2 wherein each spring element includes a base joining the element to the fret, a planar flexure section extending from the base, and a beam section extending from the flexure section having a bearing points at its tip, and wherein the bending means comprises, in combination:
clamping means for securing the base of the spring element positioned at the forming station with the flexure section of the element extending outwardly adjacent to a stationary mandrel element having a curved surface,
a station frame,
a first linear bearing race mounted to the station frame above the clamped spring element having a first carriage translating at an angle of 45 degrees with reference to a horizontal reference plane,
a moving frame secured to the first carrige of the first bearing race;
a second linear bearing race mounted to the moving frame having a second carriage translating orthogonally relative to translation of the first carriage at an angle of 135 degrees relative to the horizontal reference plane;
a chuck removably secured to the second carriage having a tip,
a cylindrical roller journalled for rotation at the tip of the chuck about an axis parallel to the curved surface of the mandrel,
a first actuator means mounted to the station frame having an arm secured to the moving frame for translating that frame in the first linear bearing race;
a second actuator means mounted to the moving frame having an actuator arm engaging a surface on the removable chuck for translating the chuck toward the mandrel surface in the second linear bearing race, the first and second actuator means being controlled by the memory controller means,
the second actuator means translating the removable chuck toward and against the mandrel surface sandwiching the flexure section of the clamped spring element between the cylindrical roller and the curved mandrel surface,
first actuator means rolling the cylindrical roller journalled for rotation at the tip of the chuck around the curved mandrel surface, the second actuator means imparting a force for forming the flexure section of the spring element around the curved mandrel surface as the cylindrical roller rolls around that surface, whereby the flexure section of the spring element is bent with a radius conforming to that of the curved mandrel surface.

12. The apparatus of claim 11 wherein,
the first bearing race pivots on the station frame about an axis angled at 15 degrees relative to the horizontal reference plane in a plane orthoganally intersecting the rotational axis of the cylindrical roller centrally between its end; and
the second linear bearing race pivots on the moving frame about an axis angled at 45 degrees reletive to the horizontal reference plane in the plane orthoganally intersecting the rotational axis of the cylindrical roller, whereby the rotational axis of the cylindrical roller can be angularly rotated in two orthogonal planes angled at 45 degrees and 135 degrees with respect to the horizontal reference plane for orienting the rotational axis of the cylindrical roller parallel to the forming surface of the mandrel.

13. The apparatus of claim 12 wherein the curved mandrel surface is cylindrical having an axis oriented parallel to the horizontal reference plane and perpendicular to a center line bisecting the flexure section of the clamped spring element.

14. The apparatus of claim 12 wherein the curved mandrel surface is planar in an axial dimension and curved in a dimension perpendicular to the axial dimension where the axial dimension of the mandrel surface has an angular relationship relative to both a center line bisecting the flexure section of the clamped spring element and the horizontal reference plane.

15. The apparatus of claims 1 and 3 wherein,
each planar spring element extending from the longitudinal fret includes a base joining the spring element to the fret, a planar flexure section extending from the base and a beam section extending from the flexure section having a bearing point at its tip, and
the radiating means includes:
an elliptical reflector,
an infrared radiation source located at one focus of the elliptical reflector,
a clamping means for securing the base of the spring element positioned at the adjust station locating its planar flexure section at the remaining focus of the elliptical reflector,
a translating shutter mechanism located between the clamping means and the elliptical reflector for isolating the spring element from direct and reflected radiations emitted by the infrared source, and
a shutter actuator means controlled by the memory controller for translating the shutter mechanism whereby exposure of the spring section of the element to the direct and reflected infrared radiation can be controlled.

16. The apparatus of claims 1, 2 or 3 wherein,
each planar spring element extending from the longitudinal fret includes a base joining the spring element to the fret, a planar flexure section extending from the base and a beam section extending from the flexure section having a bearing point at its tip, and each load sensing means comprises, in combination;
a load cell means having a sensing head for generating an electrical signal proportional to force imparted to the sensing head,
a load cell actuator means for translating the sensing head of the load cell means into engagement with the spring element at the bearing point at the tip of its beam section, the sensing head of the load cell means deflecting the tip of the spring element from an unconstrained position to a specified deflected position and supporting the tip at the deflected position.

17. The apparatus of claim 16 wherein the load cell actuator means includes,
a linear bearing race base secured to a stationary frame and having a translating carriage oriented for translation toward and away from the tip of the spring element in a vertical reference plane
means for securing the load cell means to the carriage;
a cam follower wheel rotatably secured to the carriage,
a camming structure mounted for translation on the stationary frame having an inclined surface engaging the cam follower wheel; and
a cam actuator means mounted to the stationary frame having an arm coupled to the camming structure for translating the camming structure moving the inclined surface, the cam actuator being controlled by the memory controller.

18. The apparatus of claim 17 wherein the inclined surface of the camming structure is inclined for minimizing inertial loading of the load cell means as it begins to translate from a rest postion to a measuring position with its sensing head engaging the tip of the spring and supporting it at the specified position element and from the engaged position to the rest with its sensing away from the tip of the spring element.

19. The apparatus of claim 18 further including,
a bracket secured to the translating carriage having a pair of legs extending in a plane located between the sensing head of the load cell means and the tip of the spring element supporting a bar for engaging and deflecting the tip of the spring element as the sensing head of the load cell means translates toward the distal end of the spring element; and
means secured to the stationary frame for deflecting the bracket downward reletive to the sensing head of the load cell out of engagement with the tip of the spring element as the sensing head of the load cell means translates to the measuring position, whereby the sensing head solely supports the tip of the spring element at the measuring position.

* * * * *